Aug. 12, 1958   J. E. CLINE ET AL   2,847,328
METHOD OF MAKING THORIUM OXIDE CATHODES
Filed March 4, 1957
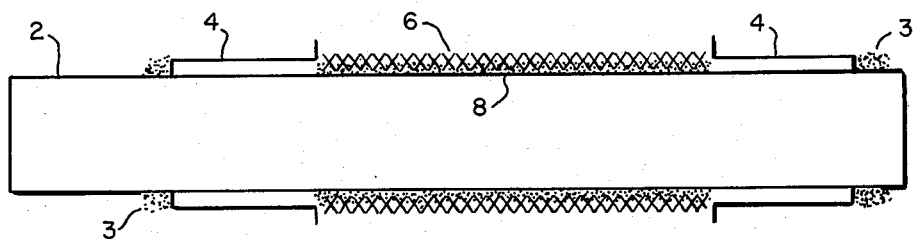
INVENTORS,
JAMES E. CLINE
JOHN P. JASIONIS
BY
Harry M. Saragovitz
ATTORNEY

2,847,328

METHOD OF MAKING THORIUM OXIDE CATHODES

James E. Cline, Brookline, and John P. Jasionis, Belmont, Mass., assignors to the United States of America as represented by the Secretary of the Army Application March 4, 1957, Serial No. 643,895

2 Claims. (Cl. 117—201)

This invention relates to a process of making thorium oxide cathodes for high-power magnetrons.

Thorium oxide cathodes show in general considerable advantages over the conventional alkaline-earth oxide cathodes, but many problems connected with the manufacture of such cathodes are still uncompletely solved. Particular difficulties have been encountered in the fabrication of large-area cathodes for high-power magnetrons.

It has been proposed to overcome the poor adhesion of thoria to a metallic base or a sintered metal surface by preparing a sintered cylinder of thoria to be carried by a cylindrical cathode sleeve. Such a thoria cylinder is made, for instance, by first converting thorium nitrate into thorium oxide by heating in an air oven at 600° C., fusing the resulting fluffy material in an electric arc, and finally crushing the fused thoria into a powder. The thoria powder is then mixed with thorium chloride to form a paste that can be molded into the desired shape. The thorium chloride in the molded ceramic is then converted into the hydroxide by placing it in an atmosphere of ammonium hydroxide for several hours. After removal from the ammonium hydroxide atmosphere and drying at room temperature, the ceramic is fired at about 1900° C. in an argon atmosphere which converts the hydroxide to the oxide forming the bond between the grains of thorium oxide. Such cylindrical thorium oxide cathodes give copious emission at 1700° C. but their manufacture is complicated and costly.

We now have found that thorium oxide cathodes, especially large-area cathodes for high-power magnetrons of excellent mechanical properties can be manufactured in a much simpler way by thoroughly mixing thorium oxide, molybdenum and ruthenium in powdered form with an appropriate lacquer to make a thick paste, pasting this mixture into the molybdenum mesh of a cathode sleeve and firing the coated cathode sleeve in a vacuum at about 1800° C.

The invention will be exemplified by describing the preparation of a specific paste made according to the invention and its use in the manufacture of the magnetron cathode shown in the accompanying drawing.

Fifty parts by weight of thorium oxide powder, forty-nine parts by weight of molybdenum powder, and one part by weight of ruthenium powder is mixed thoroughly with enough nitro-cellulose lacquer or any other appropriate organic binder to make a thick paste. Preferably, the size of these powders is less than 325 mesh. The above-described mixture is pasted into a molybdenum mesh of the magnetron cathode shown in the drawing. The cathode consists of two molybdenum cylinders or "hats" 4 assembled concentrically about a molybdenum magnetron cylinder 2. The cylinders 4 are tightly fitted and bonded to the magnetron cylinder 2, using solder materials such as nickel powder, platinum powder, ruthenium powder or mixtures of ruthenium and molybdenum powder. For instance, a minimum of pure ruthenium powder 3 may be interposed between the magnetron cylinder 2 and the cylinders 4 or applied to them where they are to be joined and the assembly is then heated above 1900° C., in known manner preferably in a reducing atmosphere to produce a reliable permanent joint. It is sufficient to keep the heat at the operating temperature for only a few seconds.

The magnetron cylinder 2 is then coated with a thin layer of a mixture of molybdenum and ruthenium powder 8 and a molybdenum wire mesh 6 is wrapped around the coated molybdenum cylinder 2. The assembled parts are heated in a molybdenum fixture (not shown in the drawing) to a temperature in the range of 1150° C. to 1400° C. to produce a preliminary mechanical bond. Thereafter, the assembled parts are removed from the fixture, again coated with the molybdenum-ruthenium powder and heated in vacuum or in an inert or reducing atmosphere to a temperature at which the powder mixture is observed to flow, which will be between about 1900° C. and 2100° C.

After this assembly has cooled down the molybdenum mesh 6 is covered with the thick paste mentioned above using a molybdenum paddle. The pasted cathode is then vacuum fired at about 1800° C. before placing the cathode in the magnetron.

The thorium oxide coating made according to the present invention has the following advantages over known thorium oxide coatings. It forms a coating which is more readily sintered to give a mechanically strong surface which is very resistant to damage in handling. A shorter time is required to age the cathode in order to arrive at stable operation of the magnetron. Power levels at very short pulse, such as one-half microsecond, were found to be generally higher in magnetrons containing a cathode made according to the present invention.

It is to be understood that the invention is not limited to the specific embodiment described in the specification; for example, the composition of the paste may be changed by using different ratios of thorium oxide, molybdenum, and ruthenium. Instead of the nitro-cellulose lacquer mentioned in the above-described example other lacquers, varnishes, or synthetic resin binders may be used provided they are inert to the materials of the cathode during firing and do not interfere with the function of the tube in which the cathode is used. Moreover, it is also to be understood that the paste made according to this invention may be used for making any desired shape or form of a cathode and may be pasted in any appropriate wire mesh before firing it.

What is claimed is:

1. Method of making thorium oxide cathodes of large areas for high power magnetrons comprising mixing in powdered form about 50 parts by weight of thorium oxide, about 50 parts by weight of molybdenum, and about one part by weight of ruthenium into an organic solvent to make a paste, pasting said mixture into a wire mesh consisting of molybdenum and firing the coated wire mesh at about 1800° C.

2. Method of making thorium oxide cathodes according to claim 1 in which the organic solvent consists of a nitro-cellulose lacquer.

References Cited in the file of this patent

UNITED STATES PATENTS

| | | |
|---|---|---|
| 2,115,828 | Prescott | May 3, 1938 |
| 2,339,392 | Garner | Jan. 18, 1944 |
| 2,614,942 | Loosjes et al. | Oct. 21, 1954 |
| 2,675,498 | Cronin | Apr. 13, 1954 |